United States Patent
Park et al.

(10) Patent No.: US 11,652,227 B2
(45) Date of Patent: May 16, 2023

(54) ANTIOXIDANT FOR FUEL CELLS AND FUEL CELL COMPRISING THE SAME

(71) Applicants: Hyundai Motor Company, Seoul (KR); Kia Motors Corporation, Seoul (KR)

(72) Inventors: In Yu Park, Seoul (KR); Jae Jun Ko, Gyeonggi-do (KR); Bo Ki Hong, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 355 days.

(21) Appl. No.: 16/786,352

(22) Filed: Feb. 10, 2020

(65) Prior Publication Data
US 2020/0313213 A1 Oct. 1, 2020

(30) Foreign Application Priority Data

Mar. 29, 2019 (KR) .................. 10-2019-0036420

(51) Int. Cl.
*H01M 8/1004* (2016.01)
*H01M 8/1007* (2016.01)
*H01M 8/10* (2016.01)

(52) U.S. Cl.
CPC ....... *H01M 8/1004* (2013.01); *H01M 8/1007* (2016.02); *H01M 2008/1095* (2013.01); *H01M 2250/20* (2013.01)

(58) Field of Classification Search
CPC ............ H01M 8/1004; H01M 8/1007; H01M 2008/1095; H01M 2250/20; H01M 4/8663; H01M 8/1041; H01M 8/1051; Y02E 60/50; Y02P 70/50; C09K 15/02
See application file for complete search history.

(56) References Cited

U.S. PATENT DOCUMENTS

| 4,830,875 A | * | 5/1989 | Lindmayer | ............ G11C 13/04 427/64 |
| 2008/0032132 A1 | * | 2/2008 | Woodfield | ............ C01G 19/02 252/182.33 |
| 2009/0098436 A1 | * | 4/2009 | Yamada | ............ H01M 4/9041 429/496 |
| 2010/0098768 A1 | * | 4/2010 | Andreescu | ............ A61K 33/243 424/617 |
| 2021/0036353 A1 | * | 2/2021 | Lee | ............ H01M 8/1044 |

FOREIGN PATENT DOCUMENTS

| JP | 5722790 B2 | 5/2015 |
| KR | 100574984 B1 | 5/2006 |
| KR | 20100067489 A | 6/2010 |
| KR | 100991154 B1 | 11/2010 |
| KR | 101148830 B1 | 5/2012 |
| KR | 101397020 B1 | 5/2014 |
| KR | 10-2017-0127167 A | 11/2017 |
| KR | 101836678 B1 | 3/2018 |

OTHER PUBLICATIONS

S. Schlick et al., "Scavenging of Hydroxyl Radicals by Ceria NanoparticlesEffect of Particle Size and Concentration", J. Phys. Chem. C 2016, 120, 6885-6890.
S. Deshpande et al., "Size dependency variation in lattice parameter and valency states in nanocrystalline cerium oxide", Appl. Phys. Lett., 87, 133113 (2005).

* cited by examiner

Primary Examiner — Muhammad S Siddiquee
(74) Attorney, Agent, or Firm — Fox Rothschild LLP

(57) ABSTRACT

Disclosed are an antioxidant which increases chemical durability of a polymer electrolyte membrane fuel cell (PEMFC) and a method for manufacturing the same. The antioxidant may prevent chemical degradation of the fuel cell and have improved antioxidation capability through a reduction reaction annealing process.

5 Claims, 6 Drawing Sheets

ANTIOXIDANT FOR FUEL CELLS AND FUEL CELL COMPRISING THE SAME

CROSS-REFERENCE TO RELATED APPLICATION

This application claims under 35 U.S.C. § 119(a) the benefit of priority to Korean Patent Application No. 10-2019-0036420 filed on Mar. 29, 2019, the entire contents of which are incorporated herein by reference.

TECHNICAL FIELD

The present invention relates to a method for manufacturing an antioxidant for fuel cells having improved antioxidation capability.

BACKGROUND

A polymer electrolyte membrane fuel cell (PEMFC) for vehicles is an electricity generation apparatus which produces electricity by electrochemical reaction between hydrogen and oxygen in air, and is well known as a next generation eco-friendly energy source which has high power generation efficiency and releases no effluent except for water. Further, the polymer electrolyte membrane fuel cell may be generally operated at a temperature of 95° C. or less and acquire high power density.

Such reaction of the fuel cell to produce electricity occurs in a membrane-electrode assembly (MEA) including a perfluorinated sulfonic acid ionomer-based electrolyte membrane, an anode and a cathode, hydrogen supplied to an oxidation electrode, i.e., the anode, of the fuel cell is separated into protons and electrons, the protons are moved to a reduction electrode, i.e., the cathode, through the membrane, the electrons are moved to the cathode through an external circuit, and oxygen molecules, the protons and the electrons react together at the cathode and thus generate electricity and heat and simultaneously generate water ($H_2O$) as a by-product.

In general, reaction gases of the fuel cell, i.e., hydrogen and oxygen in air, cross over through the electrolyte membrane and thus promote generation of hydrogen peroxide (HOOH), and such hydrogen peroxide generates oxygen-containing radicals, such as hydroxyl radicals (.OH), hydroperoxyl radicals (.OOH), and the like. These radicals attack the perfluorinated sulfonic acid ionomer-based electrolyte membrane and thus cause chemical degradation of the membrane, thereby finally having negative influences, such as lowering of durability of the fuel cell.

As conventional technology which mitigates such chemical degradation of the electrolyte membrane, a method for adding various kinds of antioxidants to the electrolyte membrane has been proposed.

For example, antioxidants are divided into primary antioxidants serving as a radical scavenger, and secondary antioxidants serving as a hydrogen peroxide decomposer. The primary antioxidants include cerium-based antioxidants, such as cerium oxide, cerium (III) nitratehexahydrate, terephthalate-based antioxidants and the like. The secondary antioxidants include manganese-based antioxidants, such as manganese oxide, and the like.

However, in the related art, cerium oxide has generally been known to have a problem that antioxidation capability and long-term stability thereof are inversely proportional to each other.

Therefore, in order to simultaneously secure both excellent antioxidation capability and acid resistance, microstructural characteristics of a cerium-based oxide need to be optimally controlled.

The above information disclosed in this Background section is only for enhancement of understanding of the background of the invention and therefore it may contain information that does not form the prior art that is already known in this country to a person of ordinary skill in the art.

SUMMARY

In preferred aspects, provided is a method for manufacturing an antioxidant that may have greatly improved antioxidation capability, by precisely controlling a crystal structure of a cerium-based oxide having excellent acid resistance through a cerium reduction reaction annealing process.

In one aspect, provided is a method for manufacturing an antioxidant for fuel cells, including preparing a compound including samarium and cerium oxide, performing primary annealing of the compound, and performing secondary annealing of a resultant product acquired through the primary annealing so as to obtain the antioxidant. In particular, the secondary annealing may be performed at a temperature equivalent to or lower than a temperature of the primary annealing.

The term "cerium oxide" as used herein refers to a compound consisting of cerium (e.g., and oxygen, for example, consisting of cerium ions (cations, e.g., $Ce^{4+}$, or $Ce^{3+}$) and oxide anions ($O^{-2}$). Preferably, cerium oxide may be ceria having a formula $CeO_2$, which may form stable crystalline structure (e.g., cubic or fluorite structure).

The compound may suitably be a samarium (Sm)-doped cerium oxide.

The term "samarium (Sm)-doped cerium oxide" as used herein refers to a cerium oxide compound modified or doped by replacing one or more cerium ions (e.g., $Ce^{4+}$, or $Ce^{3+}$) in the crystal structure of the compound with one or more samarium ion (e.g., $Sm^{2+}$, or $Sm^{3+}$). For example, when the $Ce^{4+}$ is replaced with $Sm^{3+}$ in a crystal unit, one free electron is released in that unit so that electric conductivity may be increased in the crystal structure (e.g., fluorite structure) of the compound.

The Sm-doped cerium oxide may be represented as chemical formula 1,

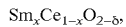  [Chemical Formula 1]

here, $0 < x \leq 0.5$, and $\delta$ may indicate an oxygen vacancy value making the Sm-doped cerium oxide expressed as chemical formula 1 electrically neutral.

The primary annealing may be performed at a temperature of about 100° C. to 1,000° C., and the secondary annealing may be performed at a temperature equivalent to or lower than the temperature of the primary annealing. For example, the secondary annealing may be performed at an equivalent temperature of the primary annealing, or less than about 5, 10, 15, 20, 25, 30, 40, 50° C. or greater than the temperature of the primary annealing.

The primary annealing and the secondary annealing may be respectively performed for about 10 minutes to 10 hours.

The primary annealing may be performed in an ambient atmosphere, and the secondary annealing may be performed in a gas atmosphere including hydrogen.

The antioxidant obtained through the secondary annealing may have greater Raman peak intensities at 553 $cm^{-1}$ and 600 $cm^{-1}$ than the resultant product obtained through the primary annealing.

In another aspect, provided is a fuel cell including a membrane-electrode assembly including an electrolyte membrane and a pair of electrodes formed on both surfaces of the electrolyte membrane, a gas diffusion layer, and a separator. In particular, at least one of the electrolyte membrane, the electrodes and the gas diffusion layer includes the antioxidant as described herein.

The antioxidant may suitably have major diffraction peaks at regions of 2θ=28±1.0°, 32±1.0°, 47±1.0° and 56±1.0° in an XRD spectrum.

The antioxidant may suitably have a crystallite size of about 5 nm to 50 nm and a BET surface area of about 10 m²/g to 200 m²/g.

The electrolyte membrane may include about 100 ppm to 100,000 ppm of the antioxidant.

Further provided is a vehicle that may include the fuel cell as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

Figure 1:
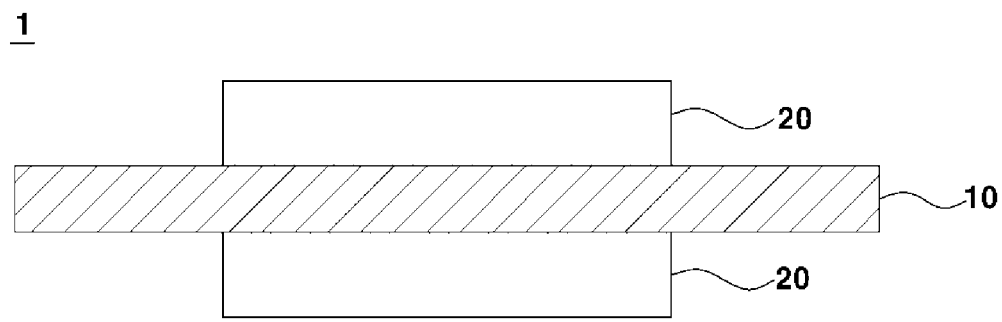
FIG. 1 is a cross-sectional view briefly illustrating an exemplary membrane-electrode assembly according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, terms, such as "including", "having", etc., will be interpreted as indicating presence of characteristics, numbers, steps, operations, elements or parts stated in the description or combinations thereof, and do not exclude presence of one or more other characteristics, numbers, steps, operations, elements, parts or combinations thereof, or possibility of adding the same.

In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing components, reaction conditions, polymer compositions and amounts of blends used in the description are approximations in which various uncertainties in measurement generated when these values are acquired from essentially different things are reflected and thus, it will be understood that they are modified by the term "about", unless stated otherwise. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, it will be understood that, if a numerical range is disclosed in the description, such a range includes all continuous values from a minimum value to a maximum value, unless stated otherwise. Further, if such a range refers to integers, the range includes all integers from a minimum value to a maximum value, unless stated otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a detailed description will be given of an exemplary antioxidant and an exemplary membrane-electrode assembly according to various exemplary embodiments of the present invention with reference to the appended drawings.

FIG. 1 is a cross-sectional view briefly illustrating a membrane-electrode assembly 1 in accordance with the present invention. As shown in FIG. 1, the membrane-electrode assembly 1 includes an electrolyte membrane 10 and a pair of electrodes formed on both surfaces of the electrolyte membrane 10. Here, the pair of electrodes means an anode and a cathode, and the anode and the cathode are located opposite to each other with the electrolyte membrane 10 interposed therebetween.

A fuel cell in accordance with the present invention includes the membrane-electrode assembly 1, a gas diffusion layer and a separator.

At least one of the electrolyte membrane 10 and the pair of electrodes 20 includes an antioxidant.

Figure 2:
FIG. 2 is a cross-sectional view illustrating an exemplary electrolyte membrane according to an exemplary embodiment of the present invention.

FIG. 2 is a cross-sectional view illustrating an exemplary electrolyte membrane 10. In FIG. 2, the electrolyte membrane 10 may be a single membrane structure including a mixture 11 of a perfluorinated sulfonic acid ionomer and an antioxidant.

Figure 3:
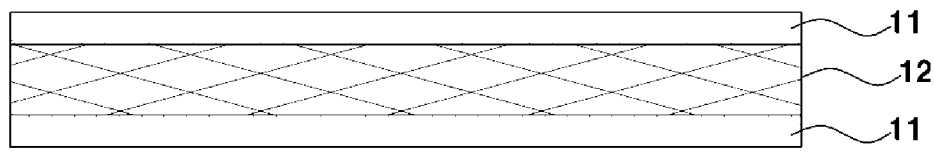
FIG. 3 is a cross-sectional view illustrating an exemplary electrolyte membrane according to an exemplary embodiment of the present invention.

FIG. 3 is a cross-sectional view illustrating of another exemplary electrolyte membrane 10. In FIG. 3, the electrolyte membrane 10 may have a three-layer structure formed by impregnating an enhancement layer 12 to increase mechanical rigidity of the electrolyte membrane 10 with a mixture 11 of a perfluorinated sulfonic acid ionomer and an antioxidant.

The enhancement layer 12 may be formed of expanded polytetrafluoroethylene (e-PTFE), and be a porous membrane having a lot of pores.

However, the electrolyte membrane 10 in accordance with the present invention is not limited to the types of FIGS. 2 and 3, and will be interpreted as having any type which includes a perfluorinated sulfonic acid ionomer to conduct ions and an antioxidant.

The electrolyte membrane 10 may include about 100 ppm to 100,000 ppm of the antioxidant based on the content of the perfluorinated sulfonic acid ionomer. When the content of the antioxidant is less than about 100 ppm, the antioxidation capability of the electrolyte membrane 10 may be excessively reduced, and thus improvement in chemical durability of the electrolyte membrane 10 may be insignificant. In contrast, when the content of the antioxidant is greater than about 100,000 ppm, proton conductivity of the electrolyte membrane 10 may be greatly reduced and brittleness of the electrolyte membrane 10 may be increased.

The perfluorinated sulfonic acid ionomer may suitably include Nafion. Preferably, the perfluorinated sulfonic acid ionomer may be Nafion.

The antioxidant may include a compound including samarium (Sm) and cerium oxide. Preferably, the antioxidant may samarium (Sm)-doped cerium oxide, which may be formed or prepared by annealing.

Figure 4:
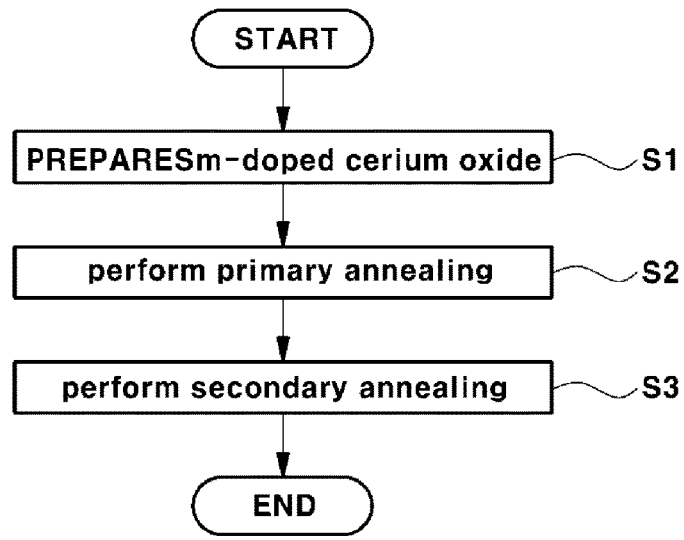
FIG. 4 is a flowchart illustrating an exemplary method for manufacturing an exemplary antioxidant according to an exemplary embodiment of the present invention.

FIG. 4 is a flowchart illustrating a method for manufacturing the antioxidant. In FIG. 4, the method for manufacturing the antioxidant may include preparing samarium (Sm)-doped cerium oxide (hereinafter referred to as 'SDC') (Operation S1), performing primary annealing of the SDC (Operation S2), and performing secondary annealing of the primarily annealed SDC (Operation S3).

The SDC may be formed by substituting trivalent samarium ions ($Sm^{3+}$) for some of tetravalent cerium ions ($Ce^{4+}$) of cerium oxide ($CeO_2$) having a fluorite structure, and may have increased oxygen vacancies and thus may have improved redox reaction characteristics.

The SDC may be expressed as chemical formula 1 below.

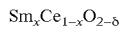

$Sm_xCe_{1-x}O_{2-\delta}$ [Chemical Formula 1]

Here, $0<x\leq0.5$, and $\delta$ indicates an oxygen vacancy value, which makes the compound expressed as the above chemical formula 1 electrically neutral, and, for example, may satisfy $0<\delta\leq0.25$.

When x is greater than 0.5, intrinsic structural characteristics of the SDC may be lowered, and thus x may satisfy the above numerical range.

In the antioxidant in accordance with the present invention, the SDC may be a base material for the antioxidant. In the following description, "the base material for the antioxidant" may mean a pristine base material to which any treatment, such as annealing, is not applied.

In preparation of the SDC (Operation S1), the SDC may be prepared of various methods, such as a hydrothermal synthesis method, a flame hydrolysis deposition method, a sol-gel auto combustion method, or combinations thereof, without limitation.

In order to simultaneously secure both excellent antioxidation capability and acid resistance of the antioxidant in an acid atmosphere of a polymer electrolyte membrane fuel cell for vehicles, it is necessary to optimally control fine structural characteristics, such as a crystallite size, a surface area, etc., of the SDC.

For this purpose, the present invention also provides a method for manufacturing an antioxidant by performing primary annealing of the SDC under specific conditions to preferentially control a crystallite size and a surface area of the SDC and then performing secondary annealing of a resultant product acquired through the primary annealing to secure both excellent antioxidation capability and acid resistance of the antioxidant.

Preferably, the secondary annealing (Operation S3) may be performed at a temperature which may equivalent to or less than the temperature of the primary annealing (Operation S2). The primary annealing (Operation S2) may be performed at a temperature of about 100° C. to 1,000° C., and the secondary annealing (Operation S3) may be performed at a temperature which is equivalent to or lower than the temperature of the primary annealing (Operation S2). In the description of the embodiments of the present invention, it will be understood that the term "equivalent to" includes the meaning of being equal to, being slightly higher than, and being slightly lower than. For example, the term "equivalent to" will be interpreted as including a range of ±5, ±10, ±15, ±20, or the like from a numerical value serving as a reference value.

When the primary annealing (Operation S2) is performed at a temperature of less than about 100° C., effects of annealing are insignificant and thus the antioxidant may have high antioxidation capability but have low acid resistance, and when the primary annealing (Operation S2) is performed at a temperature greater than about 1,000° C., effects of annealing may be excessive and thus the antioxidant may have high acid resistance but have low antioxidation capability. Further, when the primary annealing (Operation S3) is performed at a higher temperature than the temperature of the primary annealing (Operation S2), the crystallite size of the antioxidant may be additionally increased and thus the antioxidant may have excessively low antioxidation capability.

The primary annealing (Operation S2) and the secondary annealing (Operation S3) may be respectively performed for 10 minutes to 10 hours, or particularly, for about 30 minutes to 4 hours. When annealing is performed for a time less than about 10 minutes, effects of the annealing may not be sufficient, and when annealing is performed for a time greater than about 10 hours, a process cycle time may be excessively increased.

The primary annealing (Operation S2) may be performed in an ambient atmosphere, and the secondary annealing (Operation S3) may be performed in a gas atmosphere including hydrogen. When the secondary annealing (Operation S3) is performed under the gas atmosphere including hydrogen, the surface of the SDC may be effectively reduced and thus the antioxidation capability of the antioxidant may be further improved. Further, as the ratio of hydrogen in gas including hydrogen is increased, a time taken to perform reduction of the SDC may be shortened and effects thereof may be increased.

The primary annealing (Operation S2) and the secondary annealing (Operation S3) may be performed continuously or intermittently.

When the primary annealing (Operation S2) and the secondary annealing (Operation S3) are performed continuously, the primary annealing (Operation S2) of the SDC may be performed in a chamber having designated shape and size, the inner temperature of the chamber may be maintained or lowered, and then immediately the secondary annealing (Operation S3) of a resultant product acquired through the primary annealing (Operation S2) may be performed in the same chamber.

On the other hand, when the primary annealing (Operation S2) and the secondary annealing (Operation S3) are performed intermittently, after the primary annealing (Operation S2) of the SDC may be performed in one chamber which is maintained at a specific temperature, a resultant product acquired through the primary annealing (Operation S2) may be supplied to another chamber which is maintained at the same temperature as or a lower temperature than the temperature of the chamber in which the primary annealing (Operation S2) was performed, and the secondary annealing (Operation S3) of the resultant product may be performed in the chamber.

However, annealing of the SDC is not limited to the above-described method, and may be performed through any method which may achieve the objects of the present invention.

Example

Hereinafter, the antioxidant in accordance with the present invention will be described in more detail through the following examples.

Preparation of Antioxidant

Antioxidants according to examples and comparative examples were prepared under conditions stated in Table 1 below.

TABLE 1

| Category | Base material for antioxidant | Primary annealing Temp. (° C.) | Time (hr) | Secondary annealing Temp. (° C.) | Time (hr) |
|---|---|---|---|---|---|
| Comp. example A | SDC | 600 | 2 | — | — |
| Example A-1 | SDC | 600 | 2 | 400 | 2 |
| Example A-2 | SDC | 600 | 2 | 600 | 2 |
| Comp. example B | SDC | 800 | 2 | — | — |
| Example B-1 | SDC | 800 | 2 | 400 | 2 |
| Example B-2 | SDC | 800 | 2 | 600 | 2 |
| Example B-3 | SDC | 800 | 2 | 800 | 2 |
| Comp. example B-1 | SDC | 800 | 2 | 900 | 2 |
| Comp. example B-2 | SDC | 800 | 2 | 1000 | 2 |

Crystallite sizes, antioxidation capabilities, changes in oxygen vacancy concentrations and acid resistances of the antioxidants according to the examples and the comparative examples were measured as follows.

Crystallite Size

In general, crystallite size may be measured using various technologies, such as gas sorption and X-ray diffraction (XRD), and even the same material may have greatly different crystallite size values according to measurement methods. Therefore, in the present invention, crystal structures of the antioxidants were analyzed through X-ray diffraction, which is further general technology, using an X-ray diffractometer (X'Pert Pro, manufactured by Panalytical Co., in the Netherlands), and then crystallite sizes of the antioxidants were calculated using the Debye-Scherrer equation.

Figure 5:
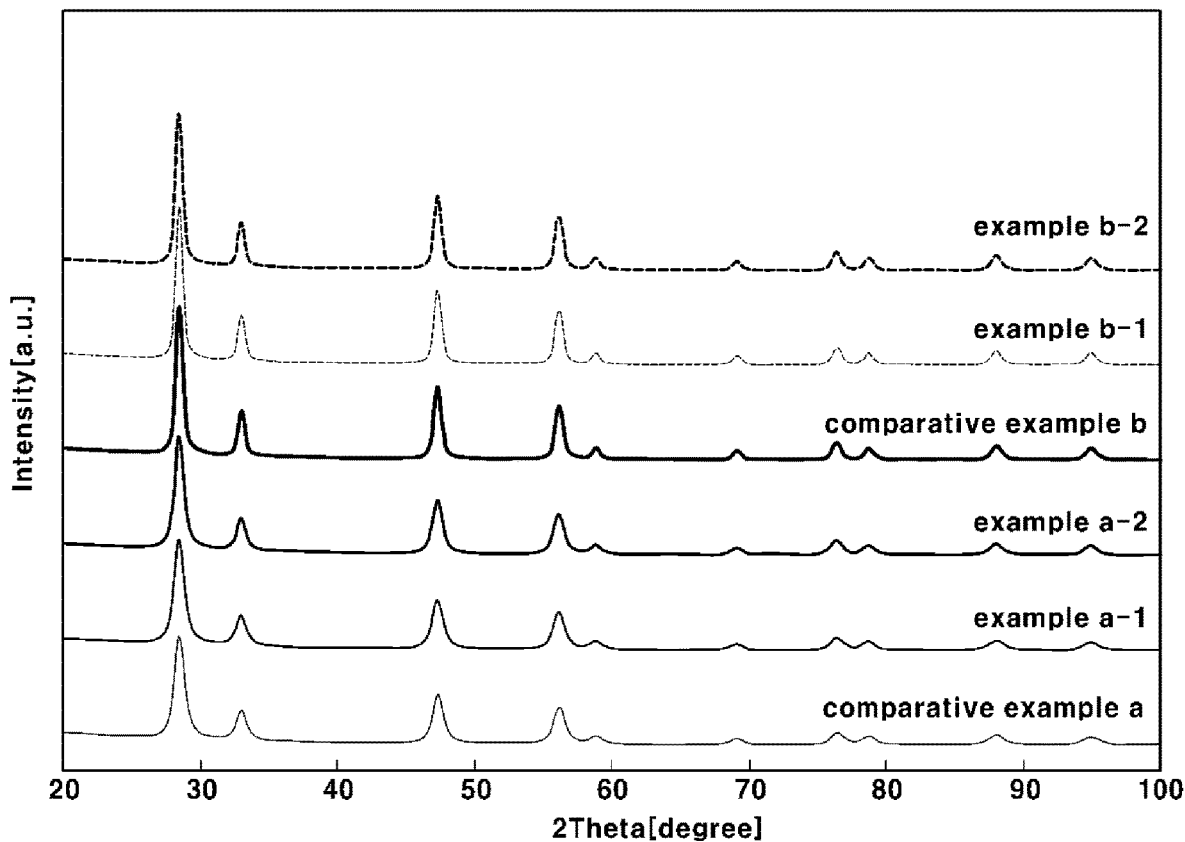
FIG. 5 is a graph representing results of X-ray diffraction analysis on antioxidants according to examples and comparative examples.

FIG. 5 is a graph representing results of X-ray diffraction analysis on the antioxidants according to the examples and the comparative examples, and Table 2 below states the crystallite sizes of the antioxidants.

TABLE 2

| Category | Crystallite size [nm] |
|---|---|
| Comp. example A | 12.0 ± 1.0 |
| Example A-1 | 11.4 ± 0.6 |
| Example A-2 | 13.1 ± 0.8 |
| Comp. example B | 21.5 ± 3.2 |
| Example B-1 | 20.7 ± 2.3 |
| Example B-2 | 21.5 ± 5.0 |
| Example B-3 | 21.2 ± 5.4 |
| Comp. example B-1 | 43.0 ± 7.8 |
| Comp. example B-2 | 48.3 ± 17.4 |

As shown in FIG. 5, it may be understood that the antioxidants showed major diffraction peaks at regions of $2\theta=28\pm1.0°$, $32\pm1.0°$, $47\pm1.0°$ and $56\pm1.0°$ in an XRD spectrum. As shown in Table 2, there were no significant differences in the crystallite sizes among the antioxidants according to comparative example A, example A-1 and example A-2 within the margin of measurement error regardless of whether or not the secondary annealing is performed.

On the other hand, according to the results of the antioxidants according to comparative examples A and B, examples A-1 and B-1 and examples A-2 and B-2, it may be understood that, when the temperature of the primary annealing is increased from 600° C. to 800° C., as exemplarily shown in FIG. 5, the peaks of crystalline characteristics of the antioxidants were more clearly developed, and thus, the crystallite sizes calculated using the Debye-Scherrer equation were increased by about 7-8 nm on average.

In the same manner, there were no significant differences in the crystallite sizes among the antioxidants according to comparative example B, example B-1 and example B-3 within the margin of measurement error regardless of whether or not the secondary annealing is performed. On the other hand, it may be understood that, when the temperature of the secondary annealing is much higher than the temperature of the primary annealing (i.e., by 100° C. or greater), as shown in comparative examples B-1 and B-2, the crystallite size of the antioxidant was rapidly increased. Therefore, in order to minimize change in the crystallite size after the primary annealing, the temperature of the secondary annealing may be equivalent to or lower than the temperature of the primary annealing.

Antioxidation Capability

1) Measurement of Antioxidation Capability Through Technique Using Methyl Violet A technique using methyl violet is a method in which methyl violet is mixed with iron (II) sulfate heptahydrate ($FeSO_4 \cdot 7H_2O$), hydrogen peroxide, de-ionized water and an antioxidant and then change in the color of methyl violet is observed.

As the antioxidation capability of the antioxidant increases, the original color of methyl violet, i.e., purple, is well maintained, and as the antioxidation capability of the antioxidant decreases, the original color of methyl violet, i.e., purple, gradually fades and is finally removed (colorless).

In the present invention, in order to evaluate the antioxidation capabilities of the antioxidants according to the examples and the comparative examples, a methyl violet test solution was manufactured by mixing a methyl violet aqueous solution, iron (II) sulfate heptahydrate ($FeSO_4 \cdot 7H_2O$) and hydrogen peroxide in a molar ratio of 1:40:40, and then about 3 mg of the antioxidants according to the examples and the comparative examples were added to the methyl violet test solution, respectively. Results of the test are shown in FIG. 6.

Figure 6:
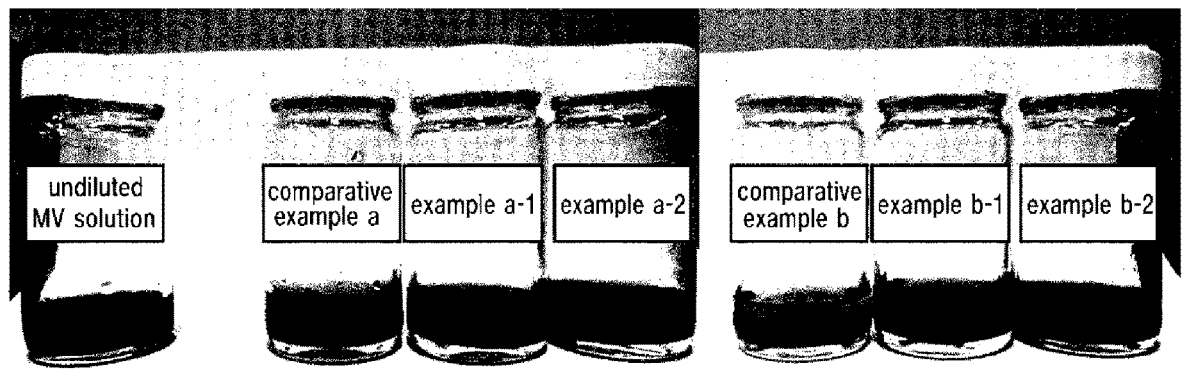
FIG. 6 is a picture representing results of antioxidation capabilities of the antioxidants according to the examples and the comparative examples, measured through a technique using methyl violet.

As shown in FIG. 6, it may be confirmed that colors of the methyl violet test solutions to which the antioxidants according to comparative examples A and B were added were greatly faded, as compared to the color of the undiluted methyl violet aqueous solution. It may be understood that as the temperature of the primary annealing is increased, the antioxidation capability of the antioxidant was decreased, the color of the test solution to which the antioxidant according to comparative example B, in which the temperature of the primary annealing was relatively high, was added was lighter than the color of the test solution to which the antioxidant according to comparative example A is added.

According to the results of the antioxidants according to examples A-1 and A-2 and examples B-1 and B-2, it may be understood that, as the secondary annealing is performed, a degree of maintenance of purple was enhanced. Particularly, in the antioxidants according to examples A-2 and B-2 in which the secondary annealing was performed at a temperature of 600° C., great enhancement in maintenance of purple was observed with the naked eye, as compared to the antioxidants according to comparative examples A and B in which the primary annealing alone was performed. Therefore, it may be confirmed that the antioxidation capability of the antioxidant was greatly improved by performing the secondary annealing.

2) Measurement of Antioxidation Capability Through UV-Visible Spectroscopy

Figure 7A:
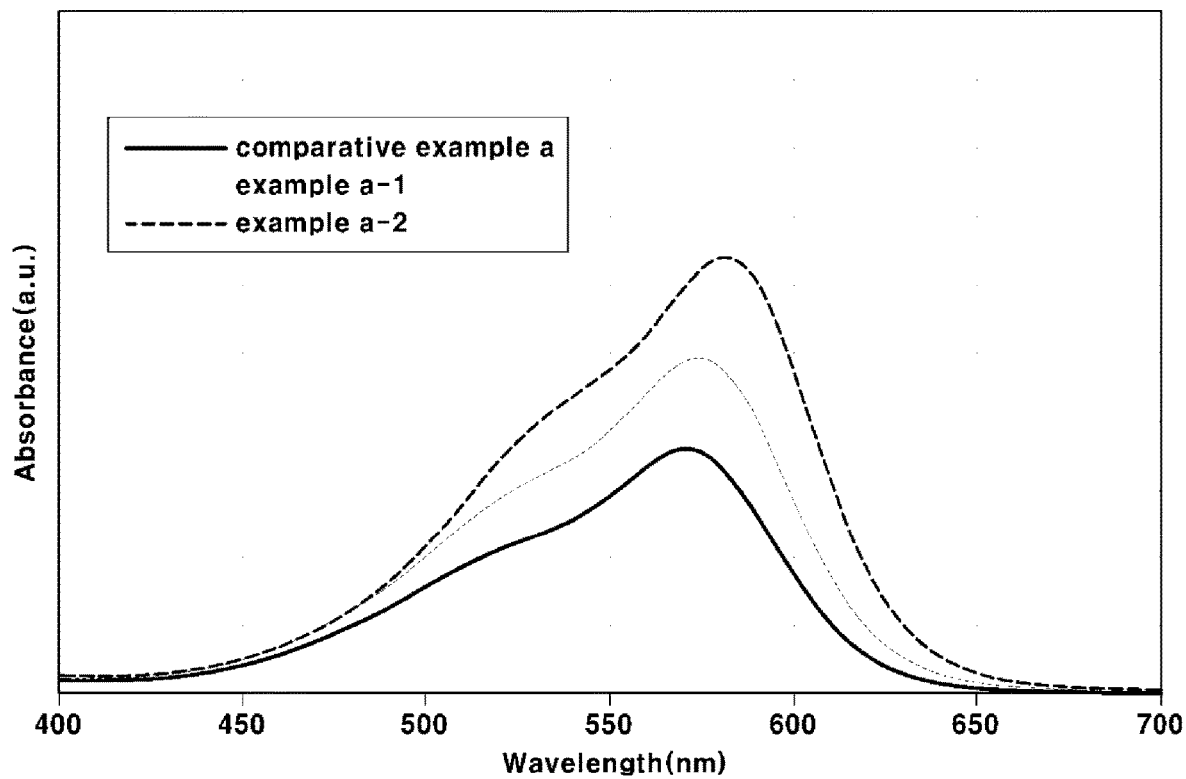
FIG. 7A is a graph representing results of antioxidation capabilities of the antioxidants according to comparative example A, example A-1 and example A-2, measured through UV-visible spectroscopy.
Figure 7B:
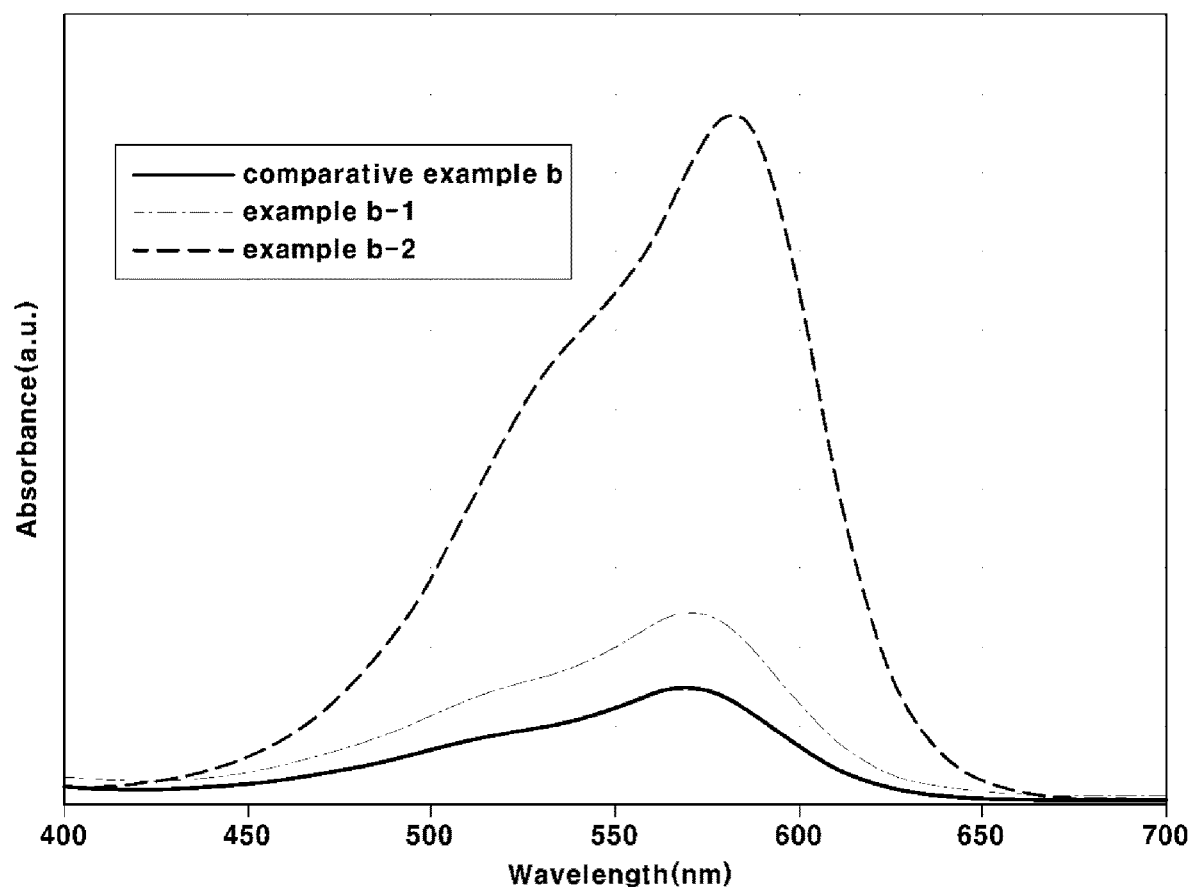
FIG. 7B is a graph representing results of antioxidation capabilities of the antioxidants according to comparative example B, example B-1 and example B-2, measured through UV-visible spectroscopy.

The antioxidation capabilities of the antioxidants according to the examples and the comparative examples were more precisely evaluated by comparatively measuring absorbance intensities of the methyl violet test solutions to which the antioxidants according to the examples and the comparative examples are added using a UV-visible spectrometer (UV-3600, Shimadzu Corporation, in Japan). Results of the measurement are shown in FIGS. 7A and 7B. FIG. 7A is a graph representing the measurement results of the antioxidation capabilities of the antioxidants according to comparative example A, example A-1 and example A-2, and FIG. 7B is a graph representing the measurement results of the antioxidation capabilities of the antioxidants according to comparative example B, example B-1 and example B-2.

Accordingly, when the antioxidation capability of the antioxidant is high, the antioxidant has a high absorbance intensity at a wavelength of about 580 nm, i.e., an intrinsic absorbance wavelength of methyl violet, and, when the antioxidation capability of the antioxidant is low, the antioxidant has a low absorbance intensity at a wavelength of about 580 nm.

As shown in FIG. 7A, it may be confirmed that the UV-visible absorbance intensities of the antioxidants according to examples A-1 and A-2 were sequentially increased, as compared to the UV-visible absorbance intensity of the antioxidant according to comparative example A.

As shown in FIG. 7B, it may be confirmed that the UV-visible absorbance intensities of the antioxidants according to examples B-1 and B-2 are sequentially increased, as compared to the UV-visible absorbance intensity of the antioxidant according to comparative example B.

Therefore, it may be understood that the antioxidation capability of the antioxidant was improved by performing the secondary annealing.

Particularly, it may be confirmed that the UV-visible absorbance intensity of the antioxidant according to example B-2, in which the primary annealing was performed at a temperature of 800° C. and the secondary annealing was performed at a temperature of 600° C., was greatly increased, as compared to the UV-visible absorbance intensity of the antioxidant according to comparative example B.

Change in Oxygen Vacancy Concentration

Figure 8A:
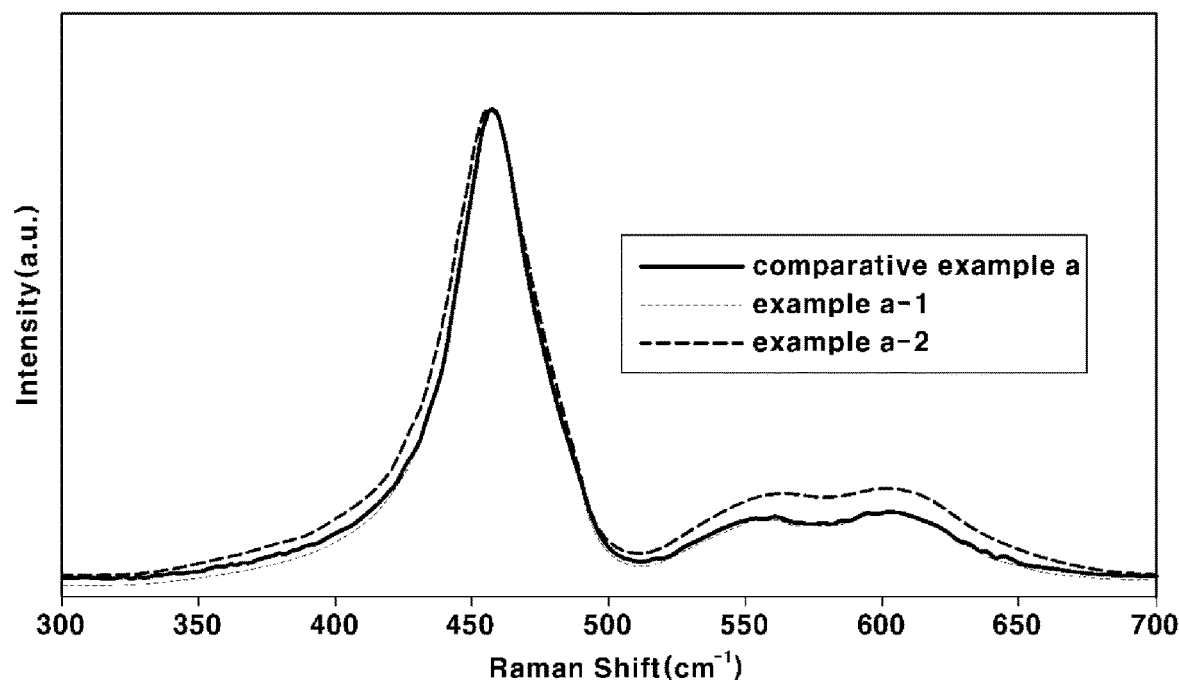
FIG. 8A is a graph representing results of changes in oxygen vacancy concentrations of the antioxidants according to comparative example A, example A-1 and example A-2, measured through Raman spectroscopy.
Figure 8B:
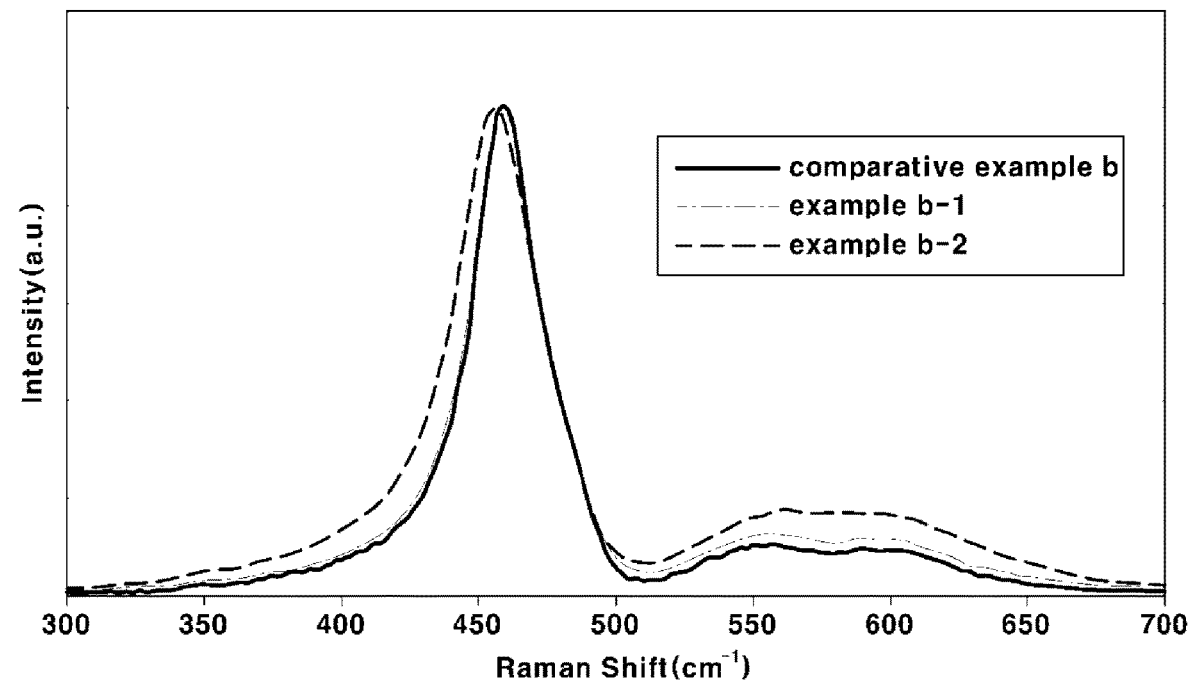
FIG. 8B is a graph representing results of changes in oxygen vacancy concentrations of the antioxidants according to comparative example B, example B-1 and example B-2, measured through Raman spectroscopy.

In order to verify changes in oxygen vacancy concentrations of the antioxidants according to the examples and the comparative examples, analysis through Raman spectroscopy was performed. Results of the analysis are shown in FIGS. 8A and 8B. FIG. 8A is a graph representing the analysis results of the antioxidants according to comparative example A, example A-1 and example A-2, and FIG. 8B is a graph representing the analysis results of the antioxidants according to comparative example B, example B-1 and example B-2.

According to the results shown in FIGS. 8A and 8B, it may be understood that, when the secondary annealing was performed, peak intensities of the antioxidants at characteristic peaks of changes in oxygen vacancy concentrations, i.e., 553 $cm^{-1}$ and 600 $cm^{-1}$ were gradually increased. Therefore, it may be determined that improvement in the antioxidation capability of the antioxidant through the secondary annealing in the present invention was caused by increase in the concentration of oxygen vacancies existing in the crystalline structure of the antioxidant.

Acid Resistance

In order to compare acid resistances of the antioxidants according to examples B-1 and B-2 and comparative example B, an acid resistance test was performed in an acid atmosphere simulating an actual operating condition of the polymer electrolyte membrane fuel cell. The antioxidants were respectively impregnated with a 2M sulfuric acid ($H_2SO_4$) solution for 48 hours, and then absorbance intensities of the solutions with which the antioxidants were impregnated were measured using UV-visible spectroscopy so as to detect acid resistances of the antioxidants.

As resistance of the antioxidant to acid, i.e., sulfuric acid, is decreased, a larger amount of the antioxidant is dissolved in the sulfuric acid solution and the absorbance intensity thereof is increased, and, as resistance of the antioxidant to acid, i.e., sulfuric acid, is increased, and the absorbance intensity of the sulfuric acid solution in which the antioxidant is dissolved is decreased. Therefore, by observing change in an absorbance intensity of the sulfuric acid solution in which the antioxidant is dissolved at a wavelength of 320 nm, corresponding to a characteristic value of $Ce^{4+}$ ions included in the antioxidant, in an absorbance wavelength of UV-visible spectroscopy, acid resistance of the antioxidant may be detected.

When the absorbance intensity was measured, the sulfuric acid solution in which the antioxidant was dissolved was diluted with de-ionized water at a ratio of 1:0.75 by volume. Results of the measurement are shown in FIG. 9.

Figure 9:
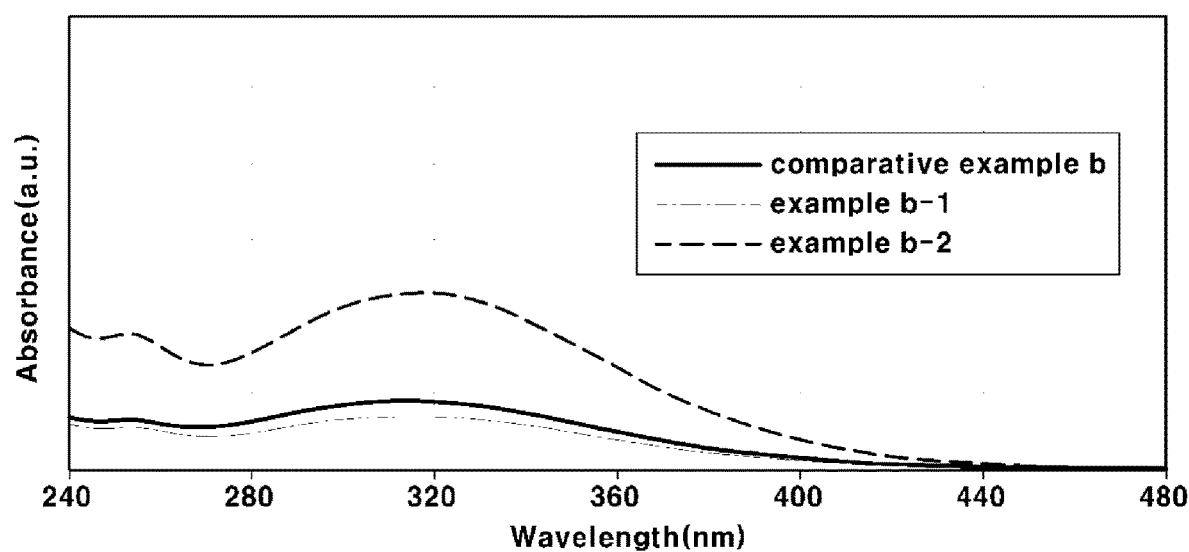
FIG. 9 is a graph representing measurement results of acid resistances of the antioxidants according to comparative example B, example B-1 and example B-2.

As shown in FIG. 9, it may be understood that, when the secondary annealing was performed, the UV-visible absorbance intensities of the antioxidants were equivalent to or slightly greater than the UV-visible absorbance intensity of the antioxidant in which the secondary annealing was not performed.

Consequently, it may be understood that the antioxidants acquired through the primary annealing and the secondary annealing had both excellent antioxidation capability and acid resistance.

According to various exemplary embodiments of the present invention, an antioxidant may exhibit both excellent antioxidation capability and acid resistance in an acid atmosphere of a polymer electrolyte membrane fuel cell for vehicles.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing an antioxidant for fuel cells, the method comprising:
   providing a samarium (Sm)-doped cerium oxide;
   performing primary annealing of the samarium (Sm)-doped cerium oxide to control a crystalline size and a surface area of the samarium (Sm)-doped cerium oxide; and
   performing secondary annealing of a resultant product acquired through the primary annealing so as to obtain an antioxidant with improved antioxidation capability and acid resistance,
   wherein the secondary annealing is performed at a temperature equivalent to or lower than a temperature of the primary annealing, and
   the primary annealing is performed in an ambient atmosphere, and the secondary annealing is performed in a gas atmosphere including hydrogen,
   wherein the antioxidant obtained through the secondary annealing has greater Raman peak intensities at 553 $cm^{-1}$ and 600 $cm^{-1}$ than the resultant product obtained through the primary annealing.

2. The method of claim 1, wherein the compound is represented as chemical formula 1,

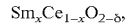  [Chemical Formula 1]

wherein 0≤x≤0.5, and δ indicates an oxygen vacancy value making the compound expressed as chemical formula 1 electrically neutral.

3. The method of claim 1, wherein the primary annealing is performed at a temperature of about 100° C. to 1,000° C., and the secondary annealing is performed at a temperature equivalent to or lower than the temperature of the primary annealing.

4. The method of claim 1, wherein the primary annealing and the secondary annealing are respectively performed for about 10 minutes to 10 hours.

5. The method of claim 1, wherein the primary annealing is performed in an ambient atmosphere, and the secondary annealing is performed in a gas atmosphere including hydrogen.

* * * * *